US012056452B2

United States Patent
Coman et al.

(10) Patent No.: US 12,056,452 B2
(45) Date of Patent: Aug. 6, 2024

(54) SELF-DISCLOSING ARTIFICIAL INTELLIGENCE-BASED CONVERSATIONAL AGENTS

(71) Applicant: Capital One Services, LLC, McLean, VA (US)

(72) Inventors: Alexandra Coman, Tysons Corner, VA (US); Rui Zhang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 309 days.

(21) Appl. No.: 17/553,349

(22) Filed: Dec. 16, 2021

(65) Prior Publication Data
US 2023/0196015 A1 Jun. 22, 2023

(51) Int. Cl.
*G10L 15/22* (2006.01)
*G06F 40/169* (2020.01)
*G06F 40/279* (2020.01)
*G06F 40/30* (2020.01)

(52) U.S. Cl.
CPC .......... *G06F 40/279* (2020.01); *G06F 40/169* (2020.01); *G06F 40/30* (2020.01)

(58) Field of Classification Search
CPC ... G10L 15/22; G10L 15/063; G10L 15/1815; G06F 40/30; G06F 40/56; G06F 40/279; G06F 40/169; G06F 203/011
See application file for complete search history.

(56) References Cited

U.S. PATENT DOCUMENTS

| 9,098,818 | B2 * | 8/2015 | Marks .............. G06Q 10/06316 |
| 11,175,147 | B1 * | 11/2021 | Olmstead ............. G05D 1/0246 |
| 11,263,241 | B2 | 3/2022 | Rezaeian et al. |
| 11,442,992 | B1 | 9/2022 | Moon et al. |
| 11,455,981 | B2 | 9/2022 | Amid et al. |

(Continued)

FOREIGN PATENT DOCUMENTS

CA    2588847 C    11/2013

OTHER PUBLICATIONS

Budhitama Subagdja and Ah-Hwee Tan. 2019. Beyond Autonomy: The Self and Life of Social Agents. In Proc. of the 18th International Conference on Autonomous Agents and Multiagent Systems (AAMAS 2019), Montreal, Canada, May 13-17, 2019, IFAAMAS, 5 pages.

(Continued)

*Primary Examiner* — Jakieda R Jackson
(74) *Attorney, Agent, or Firm* — Banner & Witcoff, Ltd.

(57) ABSTRACT

Conversational agents (CAs) may analyze language input and generate and output a response to a user. For example, when receiving a user's support request, the CA may determine whether to conduct self-disclosure by including information about the CA's "self" in a response to the user. For example, based on performing sentiment analysis of a support request user input, the CA may determine that the user is expressing negative emotions. Based on the user's expression of negative emotions, the CA may perform self-disclosure as part of generating a response to the user. A CA that is configured to engage in self-disclosure, for instance by including information about a CA's self in an output response, may increase users' acceptance of the CA, which may make a user more likely to trust and/or interact with a CA.

20 Claims, 5 Drawing Sheets

(56) References Cited

U.S. PATENT DOCUMENTS

| | | | |
|---|---|---|---|
| 11,714,855 | B2 | 8/2023 | Mahindru et al. |
| 11,741,306 | B2 | 8/2023 | Galley et al. |
| 2007/0192910 | A1* | 8/2007 | Vu ................. G05D 1/0246 |
| | | | 901/1 |
| 2008/0261181 | A1* | 10/2008 | Kennedy ............. G09B 19/04 |
| | | | 434/157 |
| 2010/0306671 | A1* | 12/2010 | Mattingly ......... H04N 21/2541 |
| | | | 715/834 |
| 2013/0036459 | A1* | 2/2013 | Liberman ........... H04L 9/0866 |
| | | | 726/6 |
| 2013/0138461 | A1* | 5/2013 | Shahraray ...... G06Q 10/06311 |
| | | | 705/7.12 |
| 2015/0254566 | A1 | 9/2015 | Chandramouli et al. |
| 2015/0287339 | A1* | 10/2015 | Deshmukh ........... G09B 19/04 |
| | | | 434/156 |
| 2016/0093226 | A1* | 3/2016 | Machluf ............... G09B 5/00 |
| | | | 434/236 |
| 2016/0136817 | A1* | 5/2016 | Fouillade ............ B25J 13/003 |
| | | | 901/1 |
| 2017/0243463 | A1* | 8/2017 | Rdzak ................... A61J 7/049 |
| 2018/0367483 | A1* | 12/2018 | Rodriguez .......... H04L 51/046 |
| 2019/0052584 | A1* | 2/2019 | Barve ................. G06Q 10/04 |
| 2019/0057143 | A1* | 2/2019 | Porter ................ G06F 16/285 |
| 2019/0103099 | A1 | 4/2019 | Panainte |
| 2019/0245812 | A1* | 8/2019 | Rico ................... H04L 63/101 |
| 2019/0273701 | A1* | 9/2019 | Basheer ............... H04L 51/02 |
| 2020/0125586 | A1* | 4/2020 | Rezaeian .............. G06F 3/048 |
| 2020/0134418 | A1* | 4/2020 | Harrington ........... H04W 4/33 |
| 2020/0160471 | A1* | 5/2020 | Bohannon ....... G06Q 10/06471 |
| 2020/0364646 | A1* | 11/2020 | Arar ............... G06Q 10/063112 |
| 2021/0035228 | A1* | 2/2021 | Silvestre .............. G06Q 40/08 |
| 2021/0104100 | A1* | 4/2021 | Whitney ............ G02B 27/0093 |
| 2021/0174288 | A1* | 6/2021 | Gvildys ................ G10L 15/26 |
| 2021/0201916 | A1* | 7/2021 | Touret ............... H04M 3/42102 |
| 2021/0212619 | A1* | 7/2021 | Crockett ............. H04L 63/0861 |
| 2021/0258345 | A1* | 8/2021 | Wardman ............ H04L 67/306 |
| 2021/0365345 | A1* | 11/2021 | Roy .................... G06F 11/3495 |
| 2022/0188304 | A1 | 6/2022 | Samal et al. |
| 2022/0199079 | A1* | 6/2022 | Hanson .................. H04L 51/02 |
| 2022/0394457 | A1* | 12/2022 | Mene .................... H04M 15/80 |
| 2023/0140791 | A1* | 5/2023 | Brambila ............. G06Q 10/103 |
| | | | 718/104 |
| 2023/0196015 | A1 | 6/2023 | Coman et al. |

OTHER PUBLICATIONS

Langley, P., Laird, J., and Rogers, S. 2009. Cognitive Architectures: Research Issues and Challenges. Cognitive Systems Research. 10. 141-160.

BiLAT Overview—USC Institute for Creative Technologies—ARL, Jun. 2012.

Kim, Julia M., et al. "BiLAT: A game-based environment for practicing negotiation in a cultural context." International Journal of Artificial Intelligence in Education 19.3 (2009): 289-308.

Marsella, Stacy C., and Jonathan Gratch. "EMA: A process model of appraisal dynamics." Cognitive Systems Research 10.1 (2009): 70-90.

Riedl MO. Computational narrative intelligence: A human-centered goal for artificial intelligence. arXiv preprint arXiv:1602.06484. Feb. 21, 2016.

Shim, Jaeeun, and Ronald C. Arkin. "A taxonomy of robot deception and its benefits in HRI." 2013 IEEE international conference on systems, man, and cybernetics. IEEE, 2013.

Vattam S, Klenk M, Molineaux M, Aha DW. Breadth of Approaches to Goal Reasoning: A Research Survey. InGoal Reasoning: Papers from the ACS Workshop Dec. 14, 2013 (p. 111).

* cited by examiner

SELF-DISCLOSING ARTIFICIAL INTELLIGENCE-BASED CONVERSATIONAL AGENTS

TECHNICAL FIELD

The present disclosure is generally related to improving the functionality of artificial intelligence (AI)-based conversational agents.

BACKGROUND

A computer-based system may be configured to execute a conversational agent (CA), such as a chatbot, which may engage in a conversation with one or more users. Increasingly, AI techniques are being employed to enhance the functionality of these CAs. For example, a CA may be configured to utilize machine learning (ML) techniques that may allow the CA to learn from previous user input, to comprehend user language input by using natural language understanding (NLU), and/or to use natural language generation (NLG) to generate language output similar to content that might be generated by a human being.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding methods, apparatuses, systems, and computer-readable media are also within the scope of the disclosure.

Systems described herein provide a computing system that may be configured to execute an application. The application may comprise a CA, which may be configured to engage in a conversation with one or more users. As part of a conversation, a CA may receive language input from a user. Such language input may take the form of text, speech, etc. The CA may be further configured to use various techniques to analyze such language input. For example, the CA may be configured to use NLU to transform the natural language input into a format that is understandable by a computing device, such as the CA. The CA may also analyze the user input, for instance by using sentiment analysis, to determine a sentiment associated with the input.

Based on analyzing the language input, the CA may generate and output a response to a user. Increasingly, such CAs are capable of producing response output that attempts to mimic the language of human beings. For example, a CA may be configured to analyze language input and generate natural language output based on the analysis. As an example, the language input may take the form of customer support requests to be handled by a customer support agent, which may be a form of CA. Based on analyzing the user's support request, the CA may determine whether to conduct self-disclosure by including information about the CA's "self" in a response to the user. For example, based on performing sentiment analysis of a support request user input, the CA may determine that the user is expressing negative emotions. Based on the user's expression of negative emotions, the CA may perform self-disclosure as part of generating a response to the user. Engaging in self-disclosure may involve including information about the CA's "self" in a response to the user. A CA that is configured to engage in self-disclosure, for instance by including information about a CA's self in an output response, may increase users' acceptance of the CA, which may make a user more likely to trust and/or interact with a CA.

Information about the CA's "self" may comprise information about the CA's: identity, memories, problem-solving processes, and/or other information about the agent as well. A CA's identity may include information such as the CA name, type (e.g., what tasks or processes the agent is configured to perform), age (e.g., when the agent was designed, first initialized, most recently initialized, etc.), how the CA is embodied, such as whether the CA is physically and/or virtually embodied. A CA's memories may include stored memories of entities or events that the CA has previously encountered, characteristics related to tasks that the CA has previously completed, etc. For example, characteristics related to tasks that the CA has previously completed may comprise an indication of a number of previously completed tasks. A CA's problem-solving processes may include rule-based problem solving, various types of machine learning, AI planning and scheduling, case-based reasoning, goal reasoning, etc.

As an example, a CA may receive a user input requesting that the CA assist the user with a problem. The user input may comprise text, such as: "Hello, you're my last hope, though I honestly doubt anything will get resolved. I've been calling and calling your company about my lost package, and sending emails, and every time they say they understand, but the problem never gets resolved, I don't think it was even clear to anyone I spoke to what my problem was. I'm desperate, I really hope you can help!" The CA may analyze the user input using sentiment analysis. Based on the sentiment analysis, the CA may conclude that the user input expresses a negative emotion, and in turn, that the CA should include some form of self-disclosure in its response to the user. The self-disclosure may indicate: that that the CA has previously solved problems similar to those described by the user, a number of similar problems solved, and/or a customer satisfaction rating of the CA's performance, as just some examples. Including such examples of self-disclosure may result in the user trusting the CA's judgment, which may prevent the user from terminating a conversation with the CA prematurely (e.g., before the CA has attempted to solve the user's problem).

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
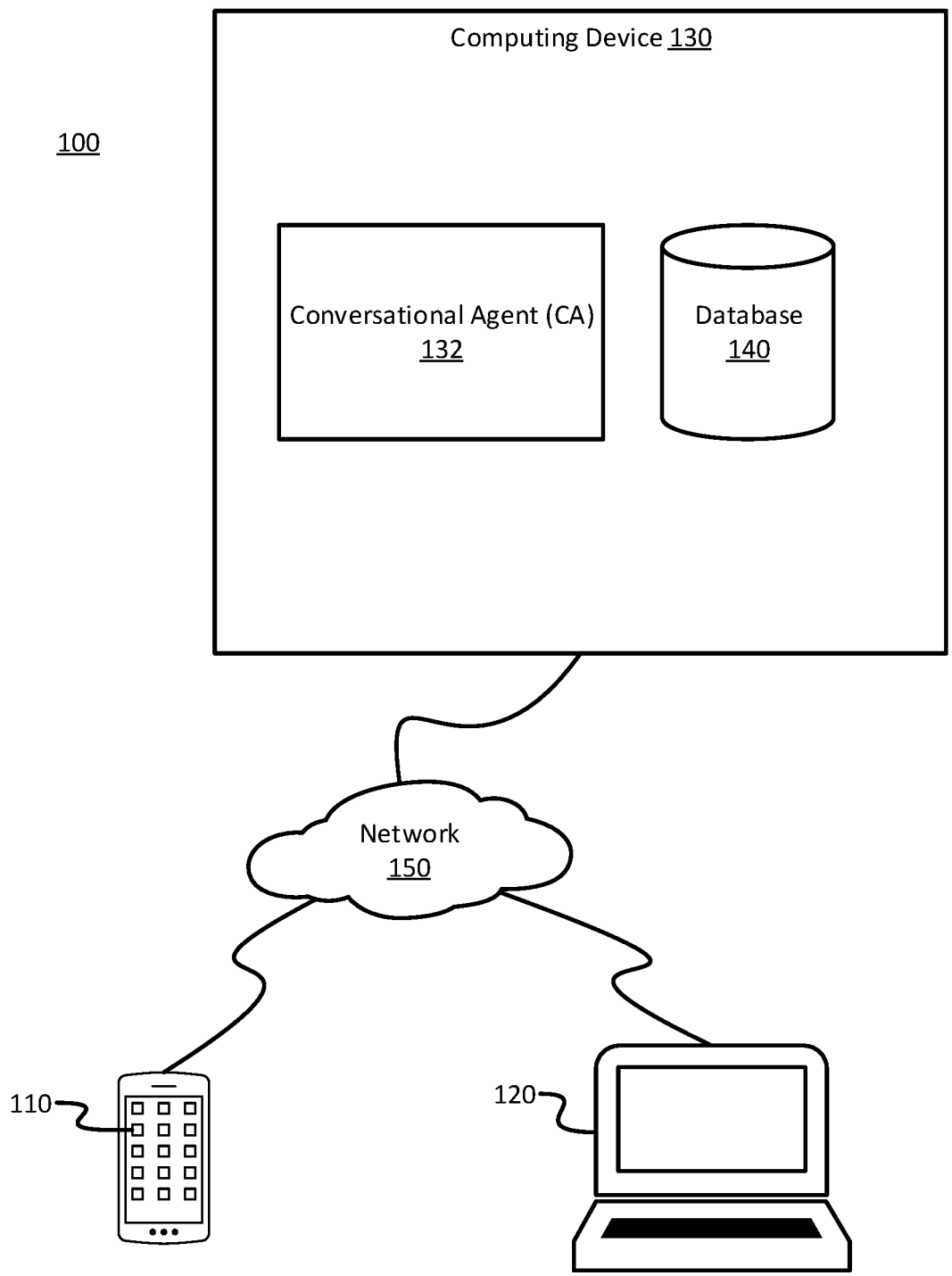
FIG. 1 shows an example of an operating environment in which one or more aspects described herein may be implemented.

In the following description of the various embodiments, reference is made to the accompanying drawings, which form a part hereof, and in which are shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and computer-based systems that are configured to execute one or more applications, such as an application that may invoke a CA. A CA configured in accordance with the techniques of this disclosure may be configured to receive user input. The user input may comprise language input, such as text or speech. Based on language user input, the CA may generate response output that is also in the form of language. After receiving user input, the CA may be configured to use various techniques, such as NLU, to transform the input data to an annotated format that is understandable by the computing device that is executing the CA. The CA may additionally or alternatively be configured to use sentiment analysis to determine one or more sentiments that are associated with the language input. Based on the configuration of the CA and/or a sentiment associated with the user input, the CA may determine whether to self-disclose when generating a response to language input. If the CA determines to self-disclose, the CA may generate a response to the language input that may comprise one or more forms of self-disclosure.

The techniques of this disclosure relate to a self-disclosure-capable CA that may be configured to include one or more forms of self-disclosure when generating an output response. Such a self-disclosure-capable CA may be capable of generating an output response that indicates information about the CA's "self" that the CA may be configured to determine.

Users may be unwilling to accept CAs generally, and/or may distrust statements generated by a CA that attempt to mimic self-disclosure. For example, a user who has previously conversed with CAs may doubt the trustworthiness and/or capability of a given CA to assist the user with the user's request. And, if a user doubts the trustworthiness of the CA, the user may be unlikely to allow the CA to assist the user with the user's request, which is undesirable for the person or organization who has deployed the CA and may also be detrimental to the user, who may otherwise benefit from the CA's help. In some instances, a less desirable CA may be configured to generate and output a response that may attempt to mimic self-disclosure, and this less desirable CA may lead to further distrust of CAs by users. For example, in response to a user input, a CA may be configured to output, "I'm an AI assistant and I'm really looking forward to helping you. I've dealt with similar issues many times before." However, the CA may be configured to output this language regardless of whether the statement, "I've dealt with similar issues many times before" is actually true. As such, a discerning user who reads this response may determine that the CA's statements do not actually reflect its past experiences, which may result in further distrust of the CA by the user.

The techniques of this disclosure improve CAs by allowing CAs to engage in more genuine self-disclosure when generating and outputting a response to a user. The self-disclosure outputted by the CA may provide information that may convince a user to allow the CA to service the user's request by sharing relevant information about the CA. Additionally, self-disclosed information may provide data that may aid in assuring the user that the response generated by the CA is correct, which may lead the user to trust the analysis of the CA. Thus, the techniques of this disclosure may improve interactions between a user and a CA by causing the user to more readily accept the output generated by such a self-disclosing CA as well as by enabling the CA to behave in a more trustworthy manner.

The techniques of this disclosure improve CAs by providing rules for a computing system to determine when to use self-disclosure allowing for computer functions to solve a problem not previously performable by a computing system. Previously a subjective process may have been in place, used by human customer service representatives, where a subjective identification of when to use self-disclosure in response to a user is used. Thus, the techniques solve a problem rooted in computer technology of when to use self-disclosure in response to a user by a CA. This provides for a technological advancement by allowing computer performance of a function not previously performable by a computer and enabling the automation of specific tasks that previously were not automated.

Operating Environments and Computing Devices

FIG. 1 shows an operating environment 100. The operating environment 100 may include at least user client device 110 and/or client device 120, and computing device (e.g., an application server 130) in communication via a network 150. It will be appreciated that the network connections shown in relation to network 150 are illustrative and any means of establishing a communications link between the computers may be used. The existence of any of various network protocols such as TCP/IP, Ethernet, FTP, HTTP and the like, and of various wireless communication technologies such as Bluetooth, GSM, CDMA, 3GPP protocols, WiFi, LTE, and/or 5G, is presumed, and the various computing devices described herein may be configured to communicate using any of these network protocols or technologies. Any of the devices and systems described herein may be implemented, in whole or in part, using one or more computing systems described with respect to FIG. 2.

Client devices 110, 120 may execute, provide data to, and/or interact with the applications described herein, such as CA 132. Examples of client devices 110, 120 may comprise computing devices, such as smartphones, tablets, laptops, wearable devices, or various other forms of computing devices as well. Access to computing device 130 or resources thereof may be restricted to certain ones of client devices 110, 120 such as client devices that provide certain credentials for authenticating users of those client devices.

Computing device 130 may comprise one or more devices, which may include processors and/or memory, that may be configured to execute a variety of different applications and/or components that may employ the techniques of this disclosure. Computing device 130 may comprise components and/or associated applications such as Conversational Agent (CA) 132, and/or database 140.

CA 132 may execute on computing device 130. CA 132 may comprise a web application, mobile application, or any other type of application. While CA 132 is illustrated as executing on computing device 130, it should be understood that CA 132 may partially execute on computing device 130, and/or on client devices 110, 120. For example, CA 132 may comprise a web application that may be rendered by a web browser executing on client devices 110, 120. In this manner, CA 132 may deliver a web-based payload to client devices 110, 120.

If CA 132 partially executes on a client device, the CA 132 application may receive data from a component of CA 132 executing on computing device 130, such as a back-end component. As another example, CA 132 may be a stand-alone application that does not communicate with computing device 130. CA 132 may be distributed, and/or execute on other devices as well. According to various examples, CA 132 may comprise a desktop application, mobile application, web application, or a combination thereof. In some examples, CA 132 may be configured as a browser extension that may execute in conjunction with a web browser. Such a web browser may in turn execute on client devices 110 or 120. CA 132 may take various other forms as well.

Computing device 130 may execute database 140, which may be an in-memory database that may offer faster database reads and writes as compared to databases that are not in-memory. Examples of such databases may include, but are not limited to: relational databases, hierarchical databases, distributed databases, in-memory databases, flat file databases, XML databases, NoSQL databases, graph databases, and/or a combination thereof.

Database 140 may store data associated with CA 132. Such stored data may comprise information that may be used to authenticate users, such as usernames and passwords, user profile information, and/or application data. Such application data may alternatively or additionally comprise previously-inputted user language inputs, data associated with the "self" of CA 132, such as identity, memories, problem-solving processes, and/or other information associated with the CA. A CA's identity may include information such as a name, type (e.g., what tasks or processes the agent is configured to perform), age (e.g., when the agent was designed, first initialized, most recently initialized, etc.), and/or how the CA is embodied, (e.g., whether the CA is physically and/or virtually embodied). Memories may comprise stored memories of entities or events that the CA has previously encountered, characteristics related to tasks that the CA has previously completed, etc. Problem-solving processes may comprise types of problem-solving processes that the CA has performed or is capable of performing, such as rule-based problem solving, various types of machine learning, AI planning and scheduling, case-based reasoning, goal reasoning, etc.

CA 132 may be configured to receive language as input and based on the language input, may generate output, which may include one or more forms of self-disclosure in some examples. CA 132 may receive natural language input from a user of a computing device, such as one or more of client devices 110, 120. As an example, the CA may be configured to receive text-based language input in the form of a request, such as a support request, that CA 132 is to process and respond to.

CA 132 may be configured to analyze natural language input using various techniques, such as NLU and sentiment analysis. Such NLU techniques may utilize a lexicon of the input language, as well as a parser and/or grammar rules to transform the input language into a format that is understandable by the computing device. As an example, CA 132 may use NLU to transform received natural language input to an annotated format. For instance, CA 132 may apply various annotations to the support request to transform the user request to an annotated format.

CA 132 may also be configured to use sentiment analysis to analyze the natural language input or the annotated format of the natural language input. The sentiment analysis may be used to determine one or more sentiments of the language input. Example sentiments may include positive, negative, neutral, and/or other sentiments. Such sentiments may be determined using knowledge-based, statistical, and/or ML techniques, as some examples. In some examples, CA 132 may determine to include self-disclosure based on a sentiment associated with a natural language input. For example, if CA 132 determines that a negative sentiment such as a "distressed," "anxious," or "stressful" sentiment is associated with the natural language input, CA 132 may determine that self-disclosure should be performed when generating a response to user input. Language inputs such as "Help me, I'm desperate" and "I'm really worried about this problem" may be classified as having "distressed," "anxious," or "stressful" associated sentiments, as just some examples. According to some examples, if sentiment analysis of the natural language input determines a positive or neutral sentiment, CA 132 may determine not to include self-disclosure in a response to the natural language input.

In addition to or as an alternative to using sentiment analysis as a basis to include self-disclosure in a response, CA 132 can be configured to include self-disclosure in a response based on other techniques as well. For example, CA 132 may be configured to use rule-based approaches, case-based reasoning, machine learning, or a combination thereof that do not use sentiment analysis to determine whether or not to include self-disclosure in a response. CA 132 may be configured to use other techniques to determine whether or not to include self-disclosure in a response as well.

Based on determining that self-disclosure information should be included in a response, CA 132 may identify one or more aspects of its "self" to include in the response. CA 132 may identify these aspects based on: the content of the natural language input, prior experience of CA 132, and/or other factors as well. CA 132 may be configured to use rule-based approaches, case-based reasoning, machine learning, or a combination thereof and/or other techniques to determine the aspects to include in the response.

In some cases, CA 132 may match the type of self-disclosure to be included in a response to a sentiment associated with the natural language input. CA 132 may match the type of self-disclosure to the sentiment by using machine learning or rule-based techniques, etc. For example, if a distrustful sentiment is associated with the natural language input, CA 132 may determine to include self-disclosure information that is assessed as likely to alleviate the user's concerns about distrust. Such self-disclosure information may indicate to the user that CA 132 is qualified to address the user's request, has previously solved similar problems, etc.

As described elsewhere herein, the self-disclosure information that CA 132 may include in a response may comprise information about its identity, memories, and/or problem-solving processes, and/or other information about CA 132, or combinations thereof. An identity of CA 132 may comprise information such a name, type (e.g., what tasks or processes the agent is configured to perform), age (e.g., when the agent was designed, first initialized, most recently initialized, etc.), how CA 132 is embodied, such as whether CA 132 is physically and/or virtually embodied, whether CA 132 has any sensors, the current location of CA 132, etc. Memories may include stored memories of entities or events that CA 132 has previously encountered, characteristics related to tasks that CA 132 has previously completed, etc. Problem-solving processes may include information related to types of problem solving performed by CA 132, such as rule-based problem solving, types of machine learning, AI planning and scheduling, case-based reasoning, goal reasoning, etc.

As an example, CA 132 may receive a natural language input such as "Hello, you're my last hope, though I honestly doubt anything will get resolved. I've been calling and calling about my order that seems to be lost in transit. I've been sending emails, and every time they say they understand, but it never gets resolved, I don't think it was even clear to anyone I spoke to what my problem was, but I haven't received my order, and I think it was lost in transit, but I need my order urgently. I'm desperate, I really hope you can help!" CA 132 may perform sentiment analysis on the natural language input to determine one or more sentiments associated with the natural language input. Examples of the determined sentiments may include "desperation," "anxiousness," and "distrust," as some non-limiting examples. CA 132 may also use NLP to determine or label the problem specified in the natural language input. For example, using NLP, CA 132 may label the natural language input as related to a "missing order," as an example.

CA 132 may create an abstracted representation of the problem, for example using NLP. In some examples, this may be based on the problem label associated with the natural language input. Based on the abstracted problem, CA 132 may consult stored information related to the problem to include in a response. In some examples, CA 132 may use case-based reasoning techniques as part of problem solving. For example, it may compare a problem identified from the natural language input to one or more problems that CA 132 has previously attempted to solve. In comparing the identified problem to previously handled problems, CA 132 may calculate one or more similarity metrics. A similarity metric may comprise a numerical value that may indicate a similarity between the previously-addressed problem and the identified problem.

In some examples, based on a similarity metric, CA 132 may determine one or more previously-solved problems that have a similarity with the identified problem that is greater than or equal to a threshold value. These previously-solved problems may be identified to determine a subset of problems that are similar enough to the problem identified from the natural language input. Based on the previously-solved problems, CA 132 may generate a response to the natural language input. CA 132 may use techniques such as machine learning (e.g., neural networks, deep learning, etc.), rule-based learning, etc. to generate the output response.

The generated response may comprise one or more forms of self-disclosure, and/or information related to the previously-solved problems. For example, CA 132 may determine that it has previously solved hundreds of problems that are similar to the problem identified from the natural language input, as identified based on the similarity metric. CA 132 may additionally or alternatively determine a number of these similar problems that it has solved over a specific past time period, e.g., the past year or past week. For example, CA 132 may generate response language such as, "I'm highly experienced in solving problems very similar to yours. In fact, I've solved hundreds of such problems over the past year, and more than ten over the past week." In some examples, CA 132 may also include information related to the success of CA 132 in addressing or solving problems that are similar to the identified problem. For example, CA 132 may include language in its response such as, "My customer satisfaction rating for this sort of problem is 4.9/5." CA 132 may generate other response language, some or all of which may comprise self-disclosure information. CA 132 may output the response to the user. Outputting the response may comprise sending the response to a device associated with a user, speaking the response aloud, for instance using text to speech (TTS), etc.

In some examples, CA 132 may repeat the process of receiving and analyzing language input, determining whether to include self-disclosure in an output response, generating and outputting a response. CA 132 may repeat this process based on receiving an additional user input, as one possible example. The additional user input may indicate additional information about the current problem or a different problem altogether, as some examples. In some examples, CA 132 may determine that the conversation with the user has ended, such as if the user indicates that their problem has been solved or if the user stops conversing with CA 132, etc.

Various computing devices are described as performing functions described in the context of operating environment 100. However, it should be noted that any computing device or combination of computing devices in the operating environment 100 may perform any of the processes and/or store any data as described herein.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in data transfers to protect the integrity of the data such as, but not limited to, Secure File Transfer Protocol (SFTP), and/or Pretty Good Privacy (PGP) encryption. In many embodiments, one or more web services may be implemented within the various computing devices of operating environment 100. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
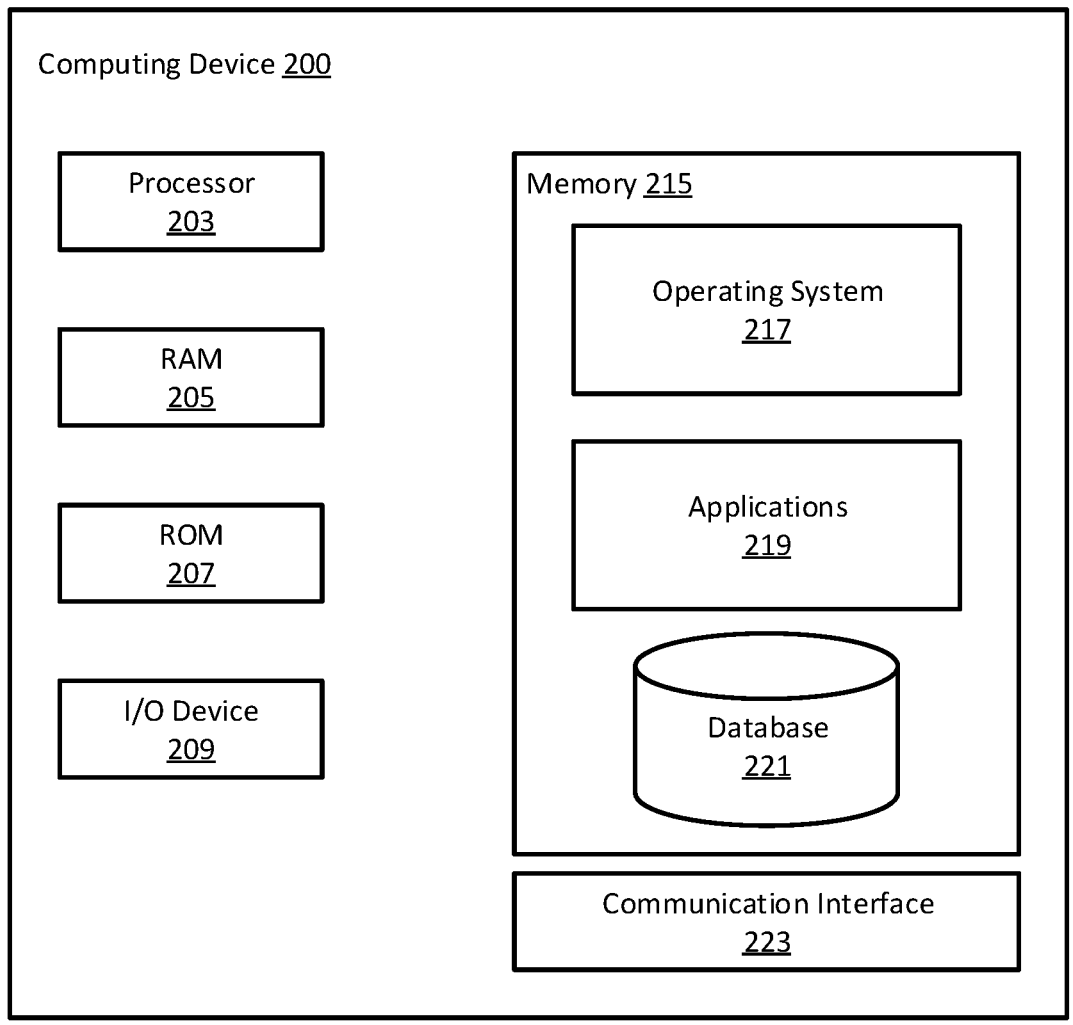
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including random access memory (RAM) 205, read only memory (ROM) 207, input/output device 209, communication interface 223, and/or memory

215. A data bus may interconnect processor(s) 203, RAM 205, ROM 207, memory 215, input/output (I/O) device 209, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, wearable device, and the like, and/or any other type of data processing device.

I/O device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, applications 219, and/or an associated internal database 221. The various hardware memory units in memory 215 may include volatile and/or nonvolatile, removable and/or non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, RAM 205, ROM 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 223 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP/S, TLS, and the like, and of various wireless communication technologies such as GSM, CDMA, WiFi, LTE, and/or 5G is presumed, and the various computing devices described herein may be configured to communicate using any of these network protocols or technologies.

Processor 203 may include a single central processing unit (CPU), which may be a single-core or multi-core processor, or may include multiple CPUs, which may have a single core or multiple cores. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Conversational Agent Flows

As discussed herein, CA 132 may be configured to receive input language, for example from a user, and based on the input language, generate a response that may include one or more forms of self-disclosure. CA 132 may output the generated response to a user in various manners.

Figure 3:
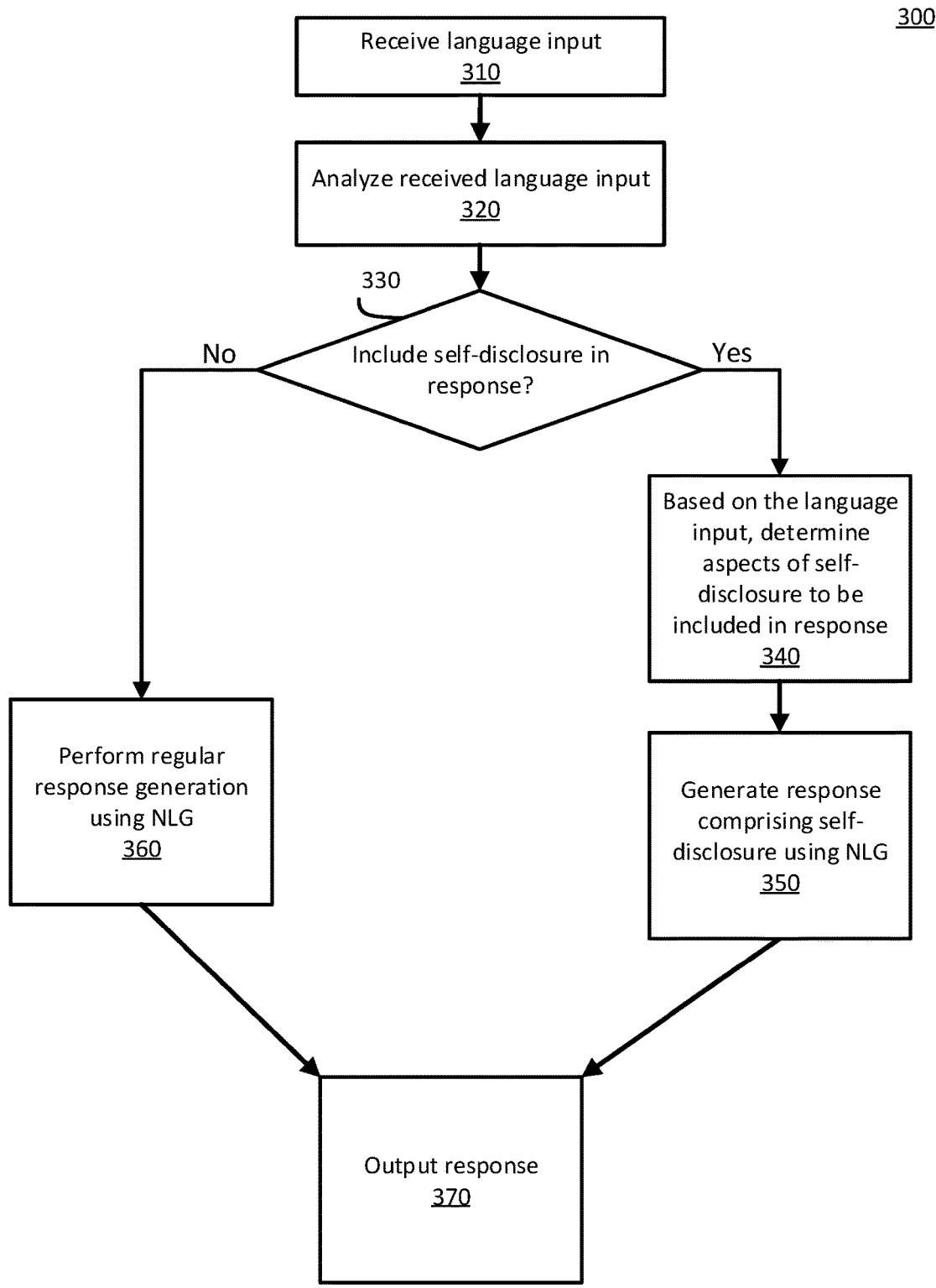
FIG. 3 shows an example of a flow chart of a process for outputting a response based on language input.

FIG. 3 shows an example flow chart of such a process 300 for outputting a response based on language input. Some or all of the steps of process 300 may be performed using one or more computing devices as described herein. In a variety of embodiments, some or all of the steps described below may be combined and/or divided into sub-steps as appropriate.

At step 310, a computing device (e.g., CA 132 executing on computing device 130) may receive language input (e.g., a natural language input), such as text or speech. The language input may be received from a client device such as one of client devices 110, 120. The natural language input may indicate a problem that the user is trying to solve or an issue for a chat agent to address.

At step 320, the computing device may analyze the received language input. The computing device may analyze the language input using various techniques, such as inference, retrieval of data from a data source, various types of evaluation, machine learning, etc. In some examples, the computing device may analyze the language input using NLU and/or sentiment analysis. NLU may transform the received language input to an augmented user input. The computing device may determine aspects such as parts of speech (e.g., subject, object, etc.). The sentiment analysis may determine one or more sentiments that may be associated with the language input. As an example of analyzing received language input for NLU, the computing device may parse the user input based on a grammar to attempt to comprehend the user input. NLU may involve various other techniques and processes as well. In some examples, the computing device may perform sentiment analysis to determine one or more sentiments associated with the user input or augmented user input. For example, if a user input is "Help me! I'm desperate!", the computing device may determine that "urgency" and/or "desperation" are sentiments that are associated with the user input.

At the decision step 330, the computing device may determine whether to include one or more forms of self-disclosure as part of a response to the language input. The computing device may determine whether to include self-disclosure as part of the response based on the sentiment associated with the user input. For example, if a negative sentiment is associated with the language input, the computing device may determine to include one or more forms of self-disclosure as part of the response. The computing device may also determine to include self-disclosure based on other sentiments as well as factors other than sentiments associated with the language input.

If the computing device (e.g., CA 132 executing on computing device 130) determines that self-disclosure should not be included in the response ("NO" branch of step 330), the computing device may proceed to step 360. At step 360, the computing device may generate a response to the language input by performing regular response generation. Performing regular response generation may involve generating a response using NLG. The generated response may not include any forms of self-disclosure.

Returning back to the decision step 330, if the computing device determines that self-disclosure should be included in the response ("YES" branch of decision step 330), the computing device may proceed to step 340. The computing device may determine to include one or more forms of self-disclosure in the response based on one or more sentiments associated with the language input. For example, the computing device may determine to include self-disclosure in the response based on one or more negative sentiments being associated with the language input. In some examples, the computing device may determine a utility of including, in the response, information representing one or more forms of self-disclosure. The determination may be based on the determined utility of including the information being greater than a threshold value where the information is only included in a response when that threshold is met.

For example, the computing device may determine a utility of including information indicating an identity of a chat agent (e.g., CA 132). The identity may comprise information such as the age, name, type of the chat agent, or how the chat agent is embodied, such as whether the CA is physically and/or virtually embodied. In some examples, the computing device may identify a plurality of previously-received text inputs and determine to include the identity of the chat agent in the response based on the plurality of previously-received text inputs. In some examples, the computing device may identify a plurality of previously-received text inputs and determine to include the identity of the chat agent in the response based on a number of the plurality of previously-received text inputs meeting a threshold value of a number of previously-received text inputs.

For example, the computing device may determine a utility of including information indicating a stored memory of a chat agent (e.g., CA 132). The stored memory may comprise one or more indications of at least one characteristic of a previously-completed task, at least one interaction with another agent, at least one other agent with which the chat agent has collaborated, and the like. The computing device may make a determination that a utility of including the stored memory of the chat agent is greater than a threshold value and the information indicating the stored memory should be included in the response.

In another example, the computing device may determine a utility of including information about a process by which the chat agent (e.g., CA 132) previously completed a task. The computing device may make a determination that a utility of including the information about the previous process is greater than a threshold value and the information about a previous process should be included in the response. Information about a previous process may be accompanied by an indication of a number of previously completed tasks. Information about a previous process may include an indication of the similarity between the identified task and at least one previously-completed task. For example, the chat agent may (a) identify, from the text input, a task to be completed by the chat agent, (b) determine a similarity between the identified task and at least one previously completed task, and (c) include, in the response, an indication of the similarity between the identified task and the at least one previously-completed task.

At step 340, based on the language input, the computing device may determine one or more aspects of self-disclosure to be included in the response to the language input. Aspects of self-disclosure may include information about the identity, memories, problem-solving processes of the CA 132, and/or other information related to CA 132.

In some examples, self-disclosure to be included in the response may include information about aspects of the identity of the chat agent (e.g., CA 132). As described elsewhere herein, aspects of the identity of CA 132 may comprise information such as a name, type (e.g., what tasks or processes the agent is configured to perform), age (e.g., when the agent was designed, first initialized, most recently initialized, etc.), how CA 132 is embodied, such as whether CA 132 is physically and/or virtually embodied, whether CA 132 has any sensors, the current location of CA 132, etc.

In some examples, self-disclosure to be included in the response may include a stored memory. In some examples, a stored memory may comprise one or more indications of at least one characteristic of a previously-completed task, at least one interaction with another agent, or at least one other agent with which the chat agent has collaborated.

In some examples, self-disclosure to be included in the response may include a metric associated with the chat agent (e.g., CA 132). An example of a metric may comprise an average performance rating of the chat agent.

At step 350, and based on the determined aspects of self-disclosure to be included in the response, the computing device may generate the response to the language input. The computing device may do so using various techniques, such as NLG.

Regardless of whether a regular response was generated in step 360 or a response including self-disclosure was generated in step 350, the computing device may output the response at step 370. Outputting the response may take various forms such as sending a response to a device associated with the user, playing audio (e.g., using TTS), etc. In some examples, the response may comprise specific language indicating that the chat agent has included, in the response, information indicating an identity of the chat agent. In some examples, the response may comprise specific language indicating that the chat agent has included information indicating a stored memory of the chat agent in the response. In some examples, the response may comprise specific language indicating that the chat agent has included information about a process through which the chat agent previously completed the task in the response.

As discussed herein, a computing device configured in accordance with the techniques of this disclosure may determine to include one or more forms of self-disclosure in a response. As described with respect to FIG. 3, if a user provides an input to the computing device and the computing device determines that self-disclosure should be included in a response to the input, the computing device may output a response that includes one or more forms of self-disclosure that may be determined based on the input.

Figure 4:
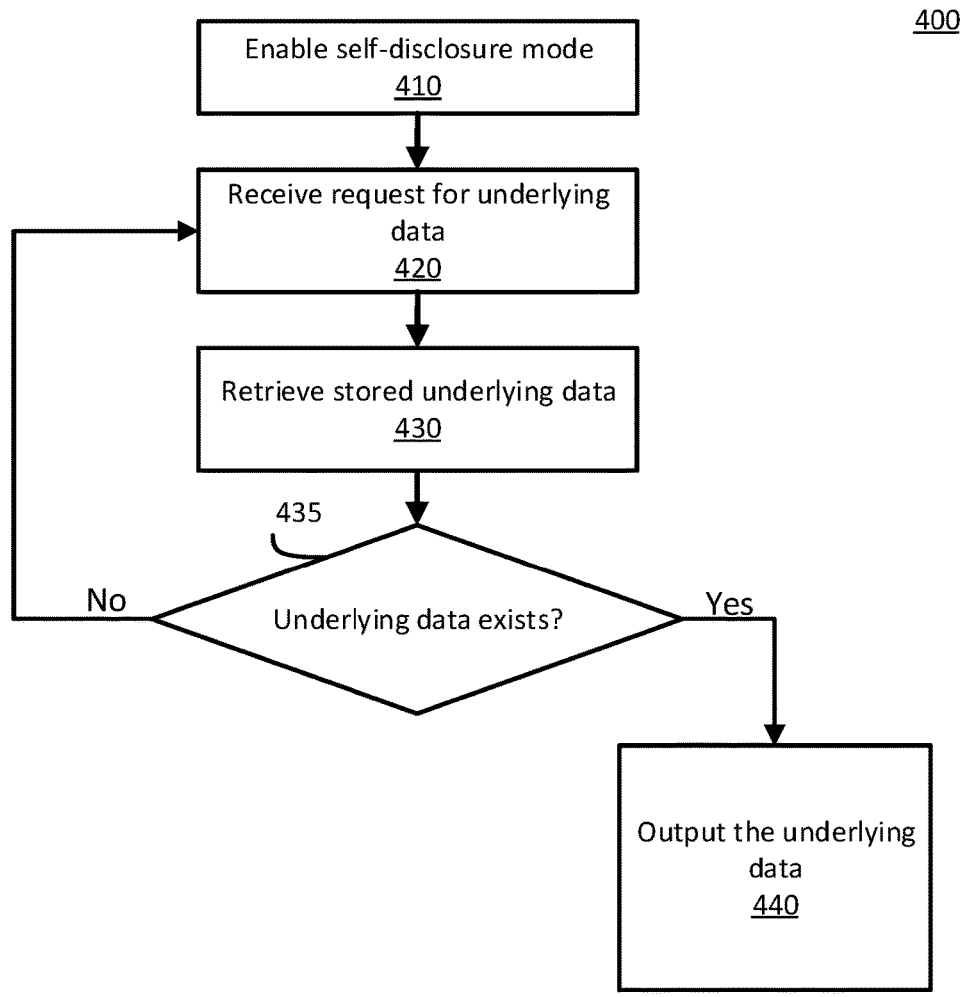
FIG. 4 shows another example flow chart of a process for outputting a response based on language input.

FIG. 4 shows an example flow chart of such a process 400 for outputting a response based on language input. Some or all of the steps of process 400 may be performed using one or more computing devices as described herein. In a variety of embodiments, some or all of the steps described below may be combined and/or divided into sub-steps as appropriate.

At step 410, the computing device (e.g., CA 132 executing on computing device 130) may be configured to enable self-disclosure mode. The computing device may enable self-disclosure mode if, for example, a user having self-disclosure mode permissions requests that the computing device enable self-disclosure mode. Such a request may be received from a client device, such as one of client devices 110 or 120. While operating in self-disclosure mode, CA 132 is able to output underlying data associated with the CA's "self." In some non-limiting examples, the underlying data may be associated with having previously solved similar problems, a number of similar problems solved, and customer satisfaction rating of the CA's performance. Some further non-limiting examples of underlying data may include other examples described herein as well as data associated with the "self" of CA 132, such as identity, memories, problem-solving processes, and/or other information associated with the CA. A CA's identity may include information such as a name, type (e.g., what tasks or processes the agent is configured to perform), age (e.g., when the agent was designed, first initialized, most recently initialized, etc.), and/or how the CA is embodied, (e.g., whether the CA is physically and/or virtually embodied). Memories may comprise stored memories of entities or events that the CA has previously encountered, characteristics related to tasks that the CA has previously completed, etc. Problem-solving processes may comprise types of problem-solving processes that the CA has performed or is capable of performing, such as rule-based problem solving, various types of machine learning, AI planning and scheduling, case-based reasoning, goal reasoning, etc.

At step 420, the computing device may receive a request for the underlying data associated with the CA's "self." The request for the underlying data may specify a previously-inputted utterance or language that was previously input to the computing device (e.g., a previously-inputted user input from a customer requesting that the CA assist the user with a problem). The request for the underlying data may also include a sentiment analysis of the previously-inputted utterance or language that was previously input to the computing device.

At step 430, and based on the received request of step 420, the computing device may retrieve the stored underlying data. The stored underlying data may be associated with the previously-inputted utterance or language. The stored underlying data may be associated with the sentiment analysis of the previously-inputted utterance.

At the decision step 435, the computing device may determine whether the underlying data exists. In some examples, there may be no associated underlying data. For example, there may not be any saved previously-inputted utterances or language or there may be a previously-inputted utterance or language but it has not been analyzed enough to generate any underlying data. In another example, the sentiment analysis of the previously-inputted utterance or language may not have resulted in a value that exceeds a threshold for the data to be designated as useful underlying data, and it may be discarded in a determination on whether associated underlying data exists. For example, a number exceeding a threshold value of similar previously-received text inputs have generated the same sentiment analysis and the underlying data may be designated as useful based on the threshold value. In another example, a number less than a threshold value of similar previously-received text inputs have generated the same sentiment analysis and the underlying data is not yet designated as useful based on the threshold value. In some examples, a determination that underlying data exists involves searching a database for underlying data that is associated with the previously-inputted utterance or language. In some examples, a determination that underlying data exists involves searching a database for underlying data that is associated with a previously-inputted utterance or language.

If the computing device (e.g., CA 132 executing on computing device 130), determines that underlying data does not exist ("NO" branch of step 435), the computing device may proceed back to step 420 to await any additional requests for underlying data. Otherwise, if the computing device determines that underlying data exists ("YES" branch of decision step 435), the computing device may proceed to step 440. At step 440, the computing device may output the underlying data that was retrieved in step 430. In some examples, the underlying data may be output as a tuple. In some examples, the underlying data may be output using NLG. The underlying data may be output in various other forms and manners as well.

Figure 5:
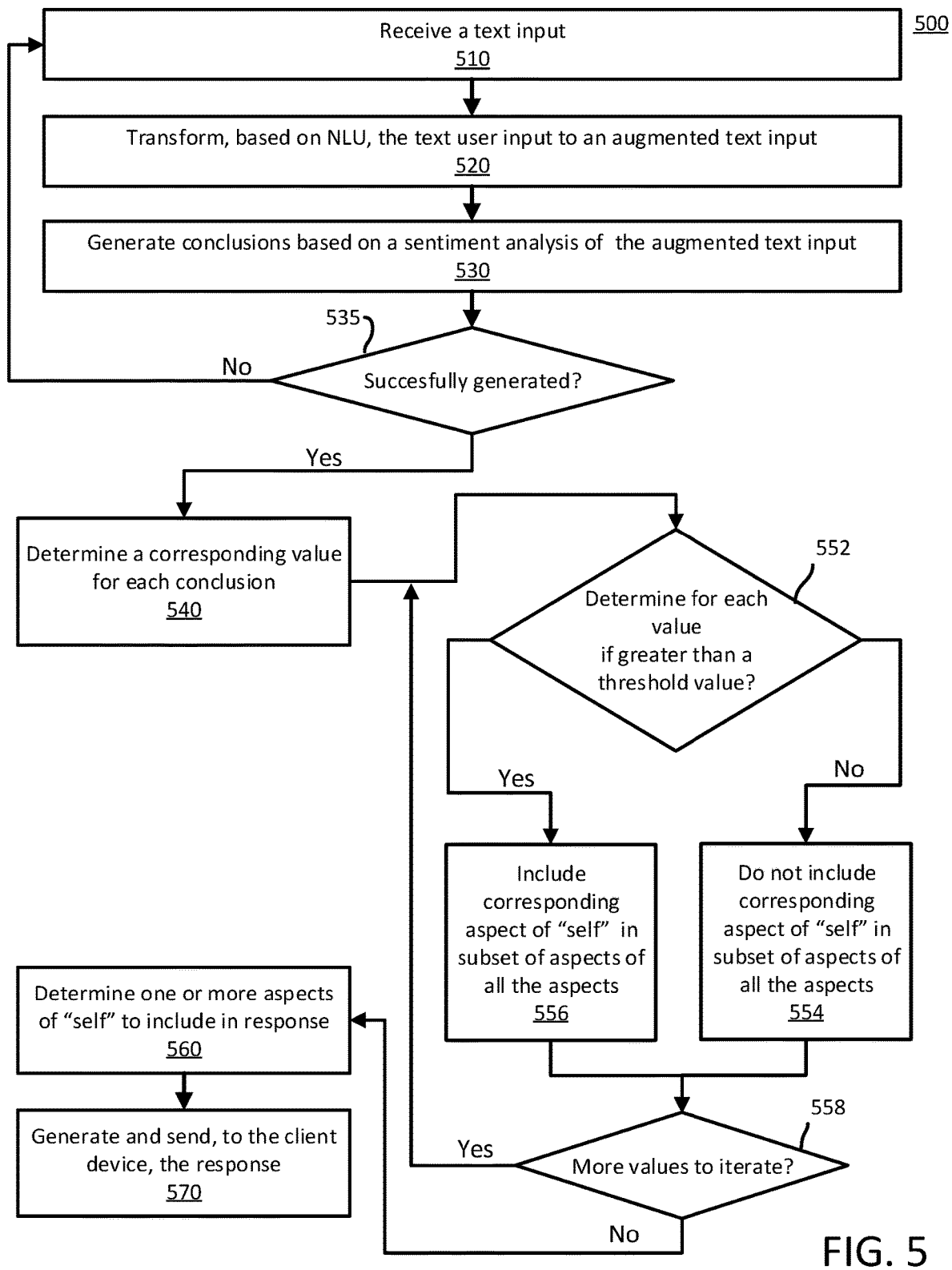
FIG. 5 shows another example of a flow chart of a process for outputting a response based on language input.

FIG. 5 shows an example flow chart of a process 500 for outputting a response based on language input. Some or all of the steps of process 500 may be performed using one or more computing devices as described herein. In a variety of embodiments, some or all of the steps described below may be combined and/or divided into sub-steps as appropriate.

Process 500 begins at step 510. At step 510, a computing device (e.g., CA 132 executing on computing device 130) may receive a text user input. The text user input may be received, for example via a chatbot executing on computing device 130, as one possible example. The text input may be received from a client device, such as one of client devices 110, 120, etc.

At step 520, the computing device may transform, based on NLU, the text input to an augmented text input. The augmented text input may comprise various annotations that are added via NLU. These annotations may enable a computing device to more readily understand the meaning of the text input received at step 510.

At step 530, the computing device may generate conclusions based on a sentiment analysis of the augmented text input. The computing device may generate these conclusions based on one or more goals with which the computing device is configured. Some or all of these goals may be preconfigured or may be determined on-the-fly, for example using machine learning or rule-based techniques. The computing device may determine the one or more conclusions based on the sentiment analysis using the preconfigured or determined goals. These conclusions may be determined using any of various techniques such as inference, retrieval of data from a data source, evaluation, etc. As an example, if a user inputs a request for customer service input in step 510, and the computing device has a goal of analyzing the request for negative sentiments, the computing device may determine that the request contains negative sentiments or does not contain negative sentiments.

The value for a given conclusion may comprise a truth value, such as whether the computing device has determined the conclusion is true or not. For example, if a user inputs a request for customer service at the text user input in step 510, and the computing device has a goal of analyzing the request for negative sentiments, the computing device may attempt to determine whether the request contains one or more negative sentiments. If the request is determined to contain one or more negative sentiments (e.g., based on performing sentiment analysis on the request), the computing device may generate a corresponding value, such as a "true" value, which indicates that the corresponding conclusion that the request contains one or more negative sentiments is true. In some examples, the corresponding truth value for a given conclusion may be "unknown," for example if the computing device is unable to reliably determine if a given conclusion is true or false.

At the decision step 535, the computing device may determine whether one or more conclusions have been successfully generated. In some examples, there may be no conclusive results from the analysis.

If the computing device (e.g., CA 132 executing on computing device 130) determines that no conclusions have been successfully generated ("NO" branch of step 535), the computing device may proceed back to step 510 to await any additional received text inputs. Otherwise, if the computing device determines that one or more conclusions have been successfully generated ("YES" branch of decision step 535), the computing device may proceed to step 540. At step 540, and for each determined conclusion, the computing device may determine a corresponding value. Each value may indicate a utility of including a corresponding one or more aspects of a CA's "self" in the response. These values may be determined based on a function, such as a utility function. The utility function may take the current goals of the computing device and the conclusions as input, and based on the goals and the conclusions, may generate the corresponding value. In some examples, the value may comprise a probability value that the corresponding aspect of "self" should be included in an output response. If the probability value is low, the utility of including the corresponding aspect of "self" in the response may be low, and the computing device may determine to omit the corresponding aspect of "self" from the response. If the probability value is sufficiently high (e.g., greater than a threshold probability), the computing device may determine to include the corresponding aspect of "self" in the output response.

At the decision step 552, the computing device may determine for each value corresponding to a respective conclusion whether the respective value exceeds a threshold value.

If the computing device (e.g., CA 132 executing on computing device 130) determines that a respective value does not exceed a threshold value ("NO" branch of step 552), the computing device may proceed to step 554 where the corresponding aspect of "self" is not included in a subset of aspects of all the aspects. Otherwise, if the computing device determines that a respective value exceeds a threshold value ("YES" branch of decision step 552), the computing device may proceed to step 556 where the corresponding aspect of "self" is included in the subset of aspects of all the aspects.

At the decision step 558, the computing device may determine if there are more respective values to iterate through. If the computing device (e.g., CA 132 executing on computing device 130) determines that there are no more values to iterate through ("NO" branch of step 558), the computing device may proceed to step 560. Otherwise, if the computing device determines that there are more values to iterate through ("YES" branch of decision step 558), the computing device may proceed back to step 552.

At step 560, and based on the values, the computing device may determine a subset of the aspects of "self" comprising one or more aspects to include in the response. As an example, the computing device may determine which aspects of "self" to include in the modified response based on whether their corresponding probability values exceed threshold values.

At step 570, the computing device may generate a response to the user input, and send the response to the client device. The computing device may generate the response based on each conclusion included in the subset. In some examples, the computing device may use NLG to generate the response. The computing device may send the generated response to a client device, such as client device 110 or 120.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML, or XML. The computer-executable instructions may be stored on a computer-readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

What is claimed is:

1. A computer-implemented method for self-disclosure by an artificial intelligence-based chat agent during communication with a user comprising:

receiving, from a client device and by an artificial intelligence-based chat agent, text input of a user;

transforming, by the artificial intelligence-based chat agent and based on natural language understanding, the text input to an augmented text input, wherein the augmented text input comprises one or more annotations that are associated with the text input;

determining, by the artificial intelligence-based chat agent and based on the augmented text input, a utility of including, in a response to the text input, self-disclosure information indicating an identity of the artificial intelligence-based chat agent, wherein determining the utility comprises generating a conclusion based on analyzing, using sentiment analysis, whether the augmented text input includes a negative sentiment by comparing the augmented text input with previously-received text input containing negative sentiments, and determining a probability value for the conclusion based on the sentiment analysis, wherein the probability value represents a probability of the utility of including self-disclosure information in the response, wherein the self-disclosure information comprises one or more of:

a name of the artificial intelligence-based chat agent;
an age of the artificial intelligence-based chat agent; or
an indication of whether the artificial intelligence-based chat agent is physically embodied;
determining, based on the probability value being greater than a threshold probability, to include the identity of the artificial intelligence-based chat agent in the response;
generating, using natural language generation, the response, wherein the response comprises the self-disclosure information indicating the identity of the artificial intelligence-based chat agent; and
sending, to the client device, the response for output to the user.

2. The computer-implemented method of claim 1, further comprising;
determining, by the artificial intelligence-based chat agent, a utility of including, in the response, information indicating a stored memory of the artificial intelligence-based chat agent, wherein the information indicating the stored memory comprises one or more indication of:
at least one characteristic of a previously-completed task;
at least one interaction with another chat agent; or
at least one other chat agent with which the artificial intelligence-based chat agent has collaborated; and
including, in the response, the information indicating the stored memory, based on the determined utility of including the information indicating the stored memory being greater than a threshold value.

3. The computer-implemented method of claim 2, further comprising including in the response an average performance rating of the artificial intelligence-based chat agent.

4. The computer-implemented method of claim 1, further comprising;
determining, by the artificial intelligence-based chat agent, a utility of including, in the response, information about a process by which the artificial intelligence-based chat agent previously completed a task; and
including, in the response, the information about the process based on the determined utility of including the information about the process being greater than a threshold value.

5. The computer-implemented method of claim 4, wherein the information about the process is accompanied by an indication of a number of tasks previously completed by the artificial intelligence-based chat agent.

6. The computer-implemented method of claim 1, further comprising:
identifying, from the text input, a task to be completed by the artificial intelligence-based chat agent;
determining, by the artificial intelligence-based chat agent, a similarity between the identified task and at least one previously-completed task; and
including, in the response, an indication of the similarity between the identified task and the at least one previously-completed task.

7. The computer-implemented method of claim 1, further comprising:
identifying a plurality of previously-received text inputs, wherein determining to include the identity of the artificial intelligence-based chat agent in the response is further based on the plurality of previously-received text inputs.

8. The computer-implemented method of claim 1, wherein specific language of the response indicates that the artificial intelligence-based chat agent has included, in the response, information indicating an identity of the artificial intelligence-based chat agent.

9. A computing device configured to execute an artificial intelligence-based chat agent during communication with a user comprising:
one or more processors; and
memory storing instructions that, when executed by the one or more processors, cause the computing device to:
receive, from a client device and by an artificial intelligence-based chat agent, text input of a user;
transform, by the artificial intelligence-based chat agent and based on natural language understanding, the text input to an augmented text input, wherein the augmented text input comprises one or more annotations that are associated with the text input;
determine, based on the augmented text input, whether to include self-disclosure information about the artificial intelligence-based chat agent in a response to the text input, wherein the self-disclosure information about the artificial intelligence-based chat agent comprises information about one or more of:
an identity of the artificial intelligence-based chat agent;
a stored memory of the artificial intelligence-based chat agent; or
a process that the artificial intelligence-based chat agent previously completed;
determine a utility of including the self-disclosure information about the artificial intelligence-based chat agent in the response, wherein to determine the utility comprises
generate a conclusion based on analyzing, using sentiment analysis, whether the augmented text input includes a negative sentiment by comparing the augmented text input with previously-received text input containing negative sentiments, and
determine a probability value for the conclusion based on the sentiment analysis, wherein the probability value represents a probability of the utility of including self-disclosure information in the response;
determine, based on the probability value being greater than a threshold probability, to include the self-disclosure information about the artificial intelligence-based chat agent in the response;
generate, using natural language generation, the response, wherein the response comprises the self-disclosure information about the artificial intelligence-based chat agent; and
send, to the client device, the response for output to the user.

10. The computing device of claim 9, wherein the self-disclosure information indicating the identity of the artificial intelligence-based chat agent comprises one or more of:
a name of the artificial intelligence-based chat agent;
an age of the artificial intelligence-based chat agent; or
an indication of whether the artificial intelligence-based chat agent is physically embodied.

11. The computing device of claim 10, wherein the self-disclosure information indicating the identity of the artificial intelligence-based chat agent is accompanied by an average performance rating of the artificial intelligence-based chat agent.

12. The computing device of claim 9, wherein the instructions, when executed by the one or more processors, cause the computing device to:
- determine, by the artificial intelligence-based chat agent, a utility of including, in the response, information about a previous process by which the artificial intelligence-based chat agent previously completed a task; and
- include, in the response, information indicating the previous process based on the determined utility of including the information about the previous process being greater than a threshold value.

13. The computing device of claim 12, wherein the information about the previous process is accompanied by an indication of a number of tasks previously completed by the artificial intelligence-based chat agent.

14. The computing device of claim 9, wherein the instructions, when executed by the one or more processors, cause the computing device to:
- identify, from the text input, a task to be completed by the artificial intelligence-based chat agent;
- determine, by the artificial intelligence-based chat agent, a similarity between the identified task and at least one previously-completed task; and
- include, in the response, an indication of the similarity between the identified task and the at least one previously-completed task.

15. A non-transitory computer-readable storage medium comprising instructions for self-disclosure by an artificial intelligence-based chat agent during communication with a user that, when executed by one or more processors, cause a computing device to:
- receive, from a client device and by an artificial intelligence-based chat agent, text input of a user;
- transform, by the artificial intelligence-based chat agent and based on natural language understanding, the text input to an augmented text input, wherein the augmented text input comprises one or more annotations that are associated with the text input;
- determine, using sentiment analysis, at least one sentiment associated with the text input;
- determine, based on the augmented text input and the at least one sentiment, whether to include self-disclosure information about the artificial intelligence-based chat agent in a response to the text input, wherein the self-disclosure information about the artificial intelligence-based chat agent comprises information about one or more of:
  - an identity of the artificial intelligence-based chat agent;
  - a stored memory of the artificial intelligence-based chat agent; or
  - a process that the artificial intelligence-based chat agent previously completed;
- determine a utility of including the self-disclosure information about the artificial intelligence-based chat agent in the response, wherein to determine the utility comprises
  - generate a conclusion based on analyzing, using sentiment analysis, whether the augmented text input includes a negative sentiment by comparing the augmented text input with previously-received text input containing negative sentiments, and
  - determine a probability value for the conclusion based on the sentiment analysis, wherein the probability value represents a probability of the utility of including self-disclosure information in the response;
- determine, based on the probability value being greater than a threshold probability, to include the self-disclosure information about the artificial intelligence-based chat agent in the response;
- generate, using natural language generation, the response, wherein the response comprises the self-disclosure information about the artificial intelligence-based chat agent, and wherein specific language of the response indicates that information about the artificial intelligence-based chat agent is included in the response; and
- send, to the client device, the response for output to the user.

16. The non-transitory computer-readable storage medium of claim 15, wherein the self-disclosure information about the identity of the artificial intelligence-based chat agent comprises one or more of:
- a name of the artificial intelligence-based chat agent;
- an age of the artificial intelligence-based chat agent; or
- an indication of whether the artificial intelligence-based chat agent is physically embodied.

17. The non-transitory computer-readable storage medium of claim 15, further comprising instructions, that when executed by the one or more processors, cause the computing device to:
- determine, by the artificial intelligence-based chat agent, a utility of including, in the response, information about a previous process by which the artificial intelligence-based chat agent previously completed a task; and
- include, in the response, the information indicating the previous process based on the determined utility of including the information about the previous process being greater than a threshold value.

18. The non-transitory computer-readable storage medium of claim 15, further comprising instructions that when executed by the one or more processors, cause the computing device to:
- identify, from the text input, a task to be completed by the artificial intelligence-based chat agent;
- determine, by the artificial intelligence-based chat agent, a similarity between the identified task and at least one previously-completed task; and
- include, in the response, an indication of the similarity between the identified task and the at least one previously-completed task.

19. The non-transitory computer-readable storage medium of claim 17, wherein the information about the previous process is accompanied by an indication of a number of tasks previously completed by the artificial intelligence-based chat agent.

20. The non-transitory computer-readable storage medium of claim 15, wherein the response further comprises an average performance rating of the artificial intelligence-based chat agent.

* * * * *